LE ROY M. LYON.
MEANS FOR REFRIGERATING CARS.
APPLICATION FILED AUG. 5, 1905.
924,620.
Patented June 8, 1909.
2 SHEETS—SHEET 1.
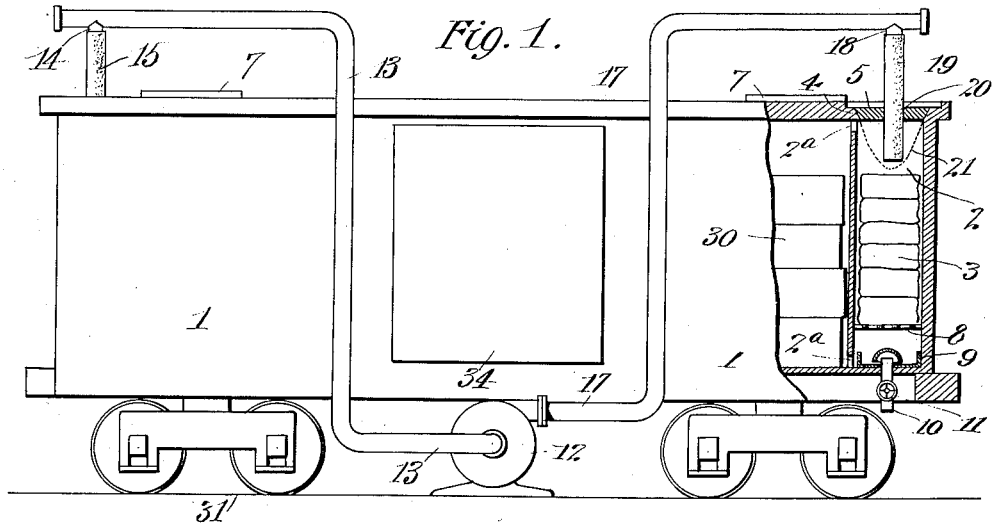
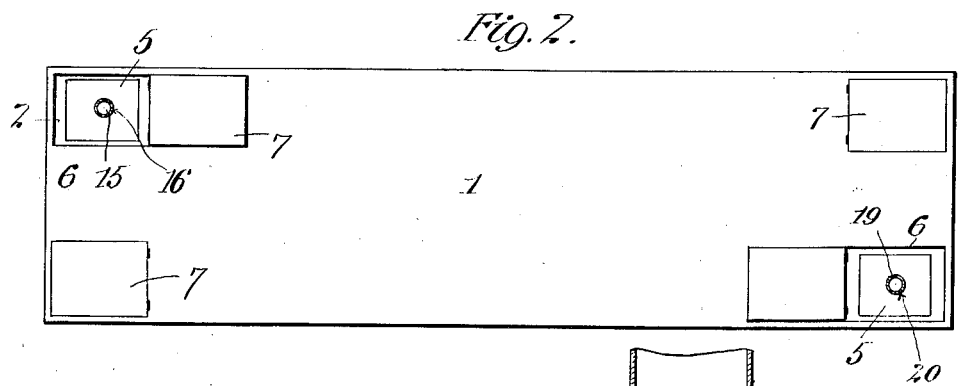
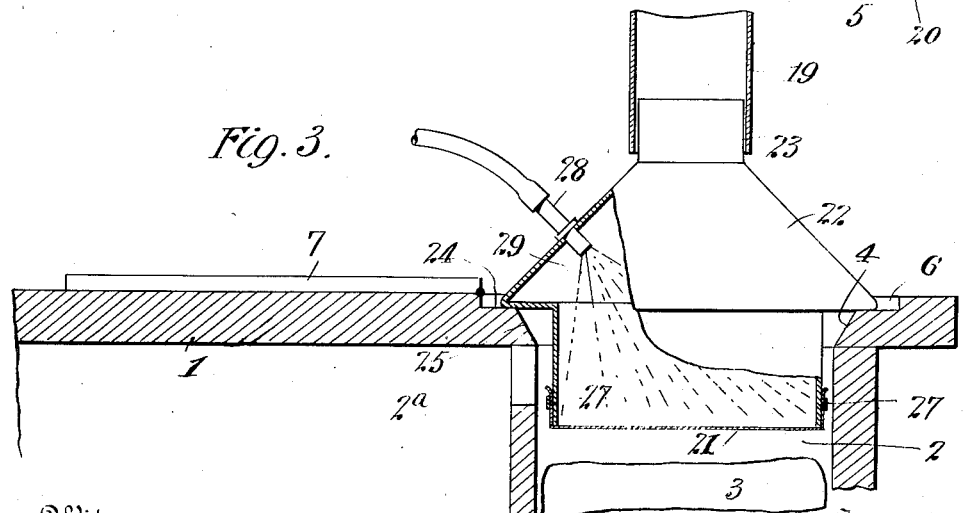
Witnesses
Francis S. Ober
William H. Stein
Inventor
LeRoy M. Lyon.
By his Attorney
Willis Fowler LE ROY M. LYON.
MEANS FOR REFRIGERATING CARS.
APPLICATION FILED AUG. 5, 1905.
924,620.
Patented June 8, 1909.
2 SHEETS—SHEET 2.
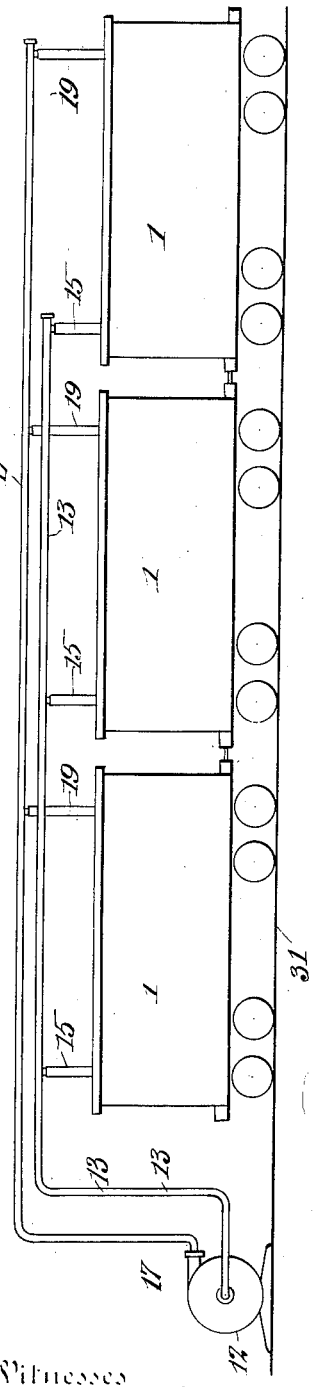
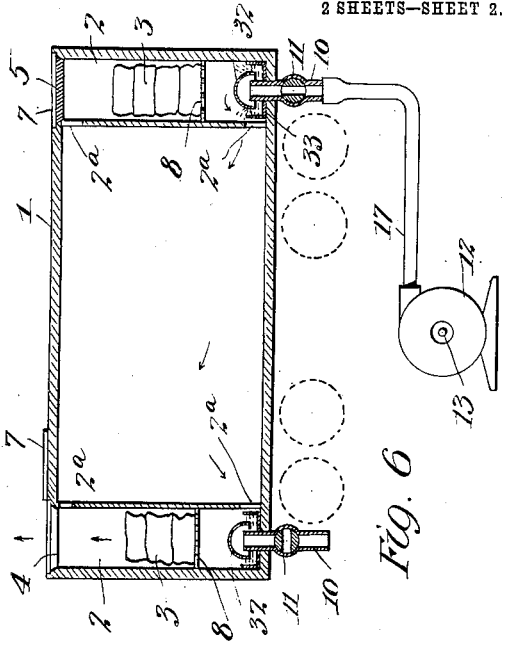
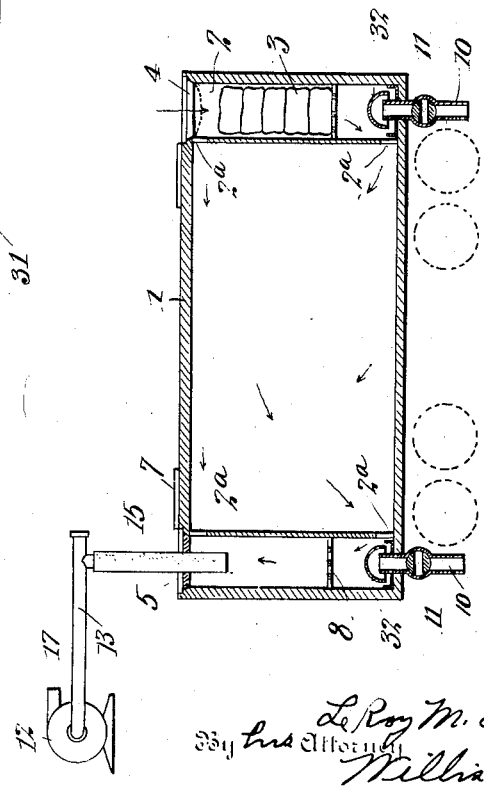

UNITED STATES PATENT OFFICE.

LE ROY M. LYON, OF CRANFORD, NEW JERSEY.

MEANS FOR REFRIGERATING CARS.

No. 924,620.  Specification of Letters Patent.  Patented June 8, 1909.

Application filed August 5, 1905. Serial No. 272,801.

*To all whom it may concern:*

Be it known that I, LE ROY M. LYON, a citizen of the United States, residing at Cranford, Union county, State of New Jersey, have invented certain new and useful Improvements in Means for Refrigerating Cars, of which the following is such a full, clear, and exact description as will enable any one skilled in the art to which it appertains to make and use the same, reference being had to the accompanying drawings, forming part of this specification.

In transporting fruit or vegetables or the like particularly in railway cars, the practice is often adopted of using a closed car in which there is arranged one or more compartments adapted to contain ice for the purpose of cooling the interior of the car during transportation and in so doing the fruit is loaded into the cars in a very warm condition, the temperature of the fruit often being above 100 degrees and after the car is loaded and closed up the cooling agency of the ice is depended upon to cool off the interior of the car and thereby reduce the temperature of the contents so that the same may be transported in good condition. A serious drawback to this old way of transporting fruit is that the high temperature of the fruit when loaded into the car is retained by the fruit for a comparatively long period, so that after the cars are in transit the ice is largely used up in the action of reducing the temperature of the fruit and if the ice cannot be promptly replaced it is soon exhausted and the temperature of the car and its contents accordingly are raised and the fruit left in a condition in which it will shortly perish.

By my present invention I seek to overcome the drawbacks to the old method, by reducing the temperature of the fruit or vegetables as they are loaded into the car or shortly thereafter, so that when the car is started in transit its contents are reduced to the minimum temperature at which it can be substantially maintained by the ice compartments in the car or other cooling medium used in such cars and in this way the ice or other cooling agent is not called upon to reduce the high temperature of the fruit, but it is reserved to maintain the interior of the car at reduced temperature when once it is established by my method.

To these ends my invention consists in the various novel and peculiar combinations of the several parts of the apparatus, all as hereinafter fully described and then pointed out in the claims.

I have illustrated types of my invention in the accompanying drawings, wherein:

Figure 1 is a side view of a closed fruit car having my improved apparatus applied thereto for reducing the temperature of the contents of the car, one end of the car being broken away and shown in vertical section the plane of which extends vertically through one of the ice compartments. Fig. 2 is a top plan view of the car, with the doors of two of the ice compartments therein open while the doors of the other two ice compartments are closed. Fig. 3 is an enlarged vertical sectional view of the upper part of one end of the car with the air blast pipe connection and spray device mounted in place above the ice compartment. Fig. 4 is a side view of a short train of refrigerating cars with my improved apparatus connected up therewith for reducing the temperature of the contents within the cars. Figs. 5 and 6 show, respectively, modifications of the apparatus, as will be hereinafter explained, each of these views showing the body of a car in vertical section.

Referring to the drawings in which like numbers of reference designate like parts throughout, 1 is a closed railway car having in each corner thereof a vertically arranged box or compartment 2, which is adapted to contain ice 3 for cooling the interior of the car. The upper end of each ice-compartment 2, is provided with a filling hole 4 having a plug 5, while in the roof of the car is an opening 6 having a hinged cover or door 7 therefor. The lower part of each ice-compartment 2 is provided with a grating or drip plate 8, beneath which is a catch basin or receptacle 9, formed preferably of metal and in the bottom of which is a waste-pipe 10, having a hand operated valve 11, for opening and closing the same.

A suction-device 12 is connected with a suitable part of the interior of the car to readily extract or exhaust the air therefrom, and this is done with considerable force by this device which may be an ordinary exhausting or vacuum pump or blower. I find that by merely forcibly extracting the air from the car, the warm fruit or vegetables placed therein are reduced in temperature, and further, that by drawing-in the outer air into the interior of the car, at a definite point or points and subjecting such incoming air to a moistening or cooling means, such for instance as ice or wet cloths or a spray of water, and then rapidly extracting from the interior of the car the air thus treated in its introduction therein, that the temperature of the fruit is quickly reduced to a very low point. In practice, I have succeeded in reducing the temperature within the car as low as 52 degrees F., by forcing the air through the moistening or cooling medium before it is introduced into the car and rapidly extracting it therefrom, and this at a time when the fruit was taken from exposure in the sun at 130 degrees F., and the normal temperature of the car being about 110 degrees. I have accomplished this low reduction of temperature by means of the air being passed through wet cloths alone without the use of ice or other refrigerant.

In the use of apparatus like that herein illustrated, I have connected the suction-pipe of the suction-device with the interior of the car, generally through the opening in the top of one of the ice-compartments for the sake of convenience, so that the air blown into the said ice-compartment is cooled in its passage through the same, and is then circulated through the car and rapidly extracted therefrom through the other ice-compartment with which the suction-pipe is connected. In this way the reduction of the temperature of the air in passing through the ice-compartment from which it is sucked, is almost immediately utilized by the suction-device blowing it back into another ice compartment and thence into the interior of the car again. In some cases I have blown the air from the suction-device into the waste-opening of an ice-compartment and have thus utilized the cold-water which accumulates therein from the melting ice, and in fact, in so doing, all of this ice-water has been consumed by being sprayed into the blast of air forced into the car.

In the apparatus herewith shown the suction-pipe 13 of the vacuum pump or suction-device 12 is extended upwardly so as to reach a point somewhat above and to one side of the car, when the same is standing on its track and from a branch pipe 14 thereof extends a flexible pipe 15 made of suitable canvas or other flexible material which is dropped in through a hole 16 formed in the removable cover 5 of an ice-compartment. A similar pipe connection 17 is extended from the exit or blowing nozzle of the suction-device 12 to a suitable point above the car track and to one side thereof, and this likewise provided with a short branch piece 18 to which is detachably connected a flexible pipe or tube 19 which may likewise be dropped through a hole 20 in the center of the cover 5 of another ice compartment. The upper part of the ice-compartment into which the air is forced from the blow pipe 17 is provided with a suitable cloth 21 which is continually moistened during the operation of the apparatus. In Fig. 3 I show an attachment which is adapted to be applied to the top of the ice compartment into which the air blast is conducted, such compartment comprising a downwardly flaring or conical shaped body 22 over the upper end 23 of which is fitted the end of the flexible pipe 19. The lower part of this body 22 is adapted to rest on the shoulder 24 of the opening of the ice-compartment 2 and is provided with a downward cylindrical extension 25 to the lower and open end of which is applied a suitable cloth 21 which is removably mounted on the lower end of this extension by means of a slip ring 27 fitting around the exterior of such extension so as to clamp the cloth between it and the ring. A spray-pipe 28 is mounted in the detachable body 22 and a spray of water 29 is ejected therefrom down upon the cloth 26 so as to form a cooling medium which for the time being may be used instead of ice as such cooling medium, it being understood that in my apparatus either these wet cloths or the water spray or the ice may be used as the moistening and cooling medium.

In the operation of the apparatus thus described, the suction-device or vacuum pump being started up forcibly extracts the air from the ice-compartment 2 with which it is connected, the air being drawn from the interior of the car through suitable openings 2ª connecting each compartment at suitably spaced points with the interior of the car. The air thus being drawn from the interior of the car is replaced by air coming from the ice compartment 2 with which the blast pipe 17 is connected, so that a continuous process is maintained of drawing the air from the interior of the car through the suction-pipe of the suction-device, passing it through such device and then forcibly injecting it back into the car through an ice-compartment. Under this condition, the injected air in passing through the wet cloth and around the ice in the compartment is thoroughly moistened and cooled and is forced thence through the interior of the car and around and over or through the contents thereof which are indicated at 30 in Fig. 1 and after extracting the heat from the contents of the car is immediately and forcibly sucked out through another ice-compartment with which the suction-pipe 13 is connected.

In arranging the apparatus herein shown, the suction-device is at a fixed point to one side of the car track indicated at 31 and both the suction and blast pipes, 13 and 17 respectively, are carried up to a suitably high point and along the railway track parallel therewith so as to be off to one side of the cars when standing on the track and at a suitable point above the tops thereof, and the flexible pipe connections or tubes 15 and 19 are made sufficiently long in order to reach well over upon the top of the car and particularly in cases where I use two diagonally opposite ice-compartments which are located in the corners of the cars. This arrangement gives considerable latitude to the movement of the cars and in fact they need not be accurately adjusted on the track relatively to the apparatus and thus considerable time is saved in connecting up the apparatus to subject the contents of the cars to my method of reducing the temperature thereof. A train of cars is shown in Fig. 4 as being connected up with my improved apparatus to cool the contents of each of the cars and it will be understood that any type of motor or driving power may be used for the vacuum pump or exhaust 12.

Instead of connecting the blast pipe 17 of the suction device with one of the compartments, this may be omitted and the suction-pipe 13 may alone be utilized by connecting it at a suitable point to extract the air from the interior of the car, air being let into the car through one of the ice-compartments, as indicated in the construction shown in Fig. 5.

In some cases I have connected the blast or blowing pipe 17 of the blower 12 directly with the waste pipe 10 of the compartment, so that by opening the valve 11 thereof and forcing the air in at this point and using a deflector 32 for driving the air through the water coming from the melting ice, such cold water is taken up by the incoming air and is passed through the openings 2ª into the body of the car and thence out through another ice-compartment to the exterior air. In operating the apparatus in this way, I avail myself of the cold temperature of the water 33 coming from the melted ice and have found that all of this water may be consumed in this manner. This arrangement of the parts is shown in Fig. 6.

In some cases I start the operation of the apparatus while the fruit is being loaded into the cars, which are provided with the usual side door 34, (see Fig. 1) so that the reduction of the temperature thereof is at once started, and when the car is filled and the door closed the method need be continued but a short while when the entire load becomes reduced to the minimum temperature. The apparatus may then be disconnected from the car and the ice-compartments being supplied with ice, the car may be started in transit with its contents at practically the minimum temperature, so that the ice is not consumed in such reduction of temperature, but is then utilized to maintain the temperature at this reduced point. In other words, when the car is in transit, the ice or other refrigerant has but the one function to perform, namely, that of keeping the temperature at the reduced point to which my method has brought it before the car is started and before the ice is stored for final use in the compartments. It will thus be seen that while I use the ice for the time being to moisten and cool the air blast or other current of air in the method, that whatever ice is thus consumed is replaced before the car starts in transit and that as a matter of fact, the consumption of the ice in cooling the air current in my method is very small. I have also found that by starting up the action of the apparatus while the car is being loaded that in some cases it facilitates the work of loading the cars. For instance, where cantaloups are taken from the fields in the sun at a temperature of about 130 degrees, and brought immediately into the car where the temperature is over 110 degrees, it is often difficult for persons to work in the car near the heated fruit because of the intense heat therefrom. By starting to reduce the temperature of the fruit as soon as it is loaded in the car, the objections just stated are overcome and the handling of the fruit is made easier.

The ordinary refrigerating car is practically closed at all points against the admission of air, so that when in my method one of the ice-compartments is opened to admit the air, that is practically the only point at which it can enter the car.

Having thus described my invention what I claim and desire to secure by Letters Patent is:—

1. The combination of a closed car having separate ice compartments each in communication with the interior of the car, a suction device having its suction pipe connected with one of said ice compartments and its exhaust pipe connected with the other, whereby the air may be forcibly extracted from the interior of the car through one ice compartment and passed through said suction device thence back through another ice compartment into the interior of the car, substantially as and for the purpose set forth.

2. In means for refrigerating cars, a car body provided with a chamber at each end for a refrigerant and an interposed storage chamber for perishable matter, the walls of said refrigerant chambers having openings at top and bottom communicating directly with the storage chamber, an air circulating device having its suction and delivery sides connected respectively to said refrigerant chambers through openings distinct from the openings between said refrigerant chambers and storage chamber, whereby a divided forced draft of air is caused to flow from the top and bottom of one refrigerant chamber through the storage chamber and into the top and bottom of the other refrigerant chamber.

In testimony whereof, I have hereunto set my hand in the presence of the two subscribing witnesses.

LE ROY M. LYON.

Witnesses:
FREDERICK W. HAMBERG,
WILLIS FOWLER.